(12) United States Patent
Yee et al.

(10) Patent No.: US 6,203,922 B1
(45) Date of Patent: Mar. 20, 2001

(54) HIGH GLASS TRANSITION TEMPERATURE, DUCTILE, AND PROCESSABLE THERMOPLASTIC CONTAINING CONFORMABLE RING SEGMENTS

(75) Inventors: Albert F. Yee; Xiangyang Li, both of Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 09/528,665

(22) Filed: Mar. 20, 2000

(51) Int. Cl.[7] .............................. B32B 27/06; C08G 63/00
(52) U.S. Cl. ..................... 428/480; 528/190; 528/191; 528/193; 528/196
(58) Field of Search ..................................... 528/190, 191, 528/193, 196; 428/480

(56) References Cited

U.S. PATENT DOCUMENTS

| | | |
|---|---|---|
| 4,895,919 | 1/1990 | Faler et al. . |
| 5,276,213 | 1/1994 | Serini et al. . |
| 5,340,907 | 8/1994 | Yau et al. . |

OTHER PUBLICATIONS

X. Li, A.F. Yee, Abstract Correlation Of The Scope Of Sub–$T_g$ Molecular Motion With The Ductility Of Polymers Based On SBI X, Macromolecular Science and Engineering Center, University of Michigan, American Physical Society's Mar. 1999 Meeting.

X. Li, A.F. Yee, Abstract "A Molecular Design To Enhance Toughness Of High $T_{-g}$ Glassy Polyesters And Polyestercarbonates", University of Michigan, American Physical Society's Mar. 2000 Meeting.

X. Li, A.F. Yee, Correlation Of The Scale of Sub–$T_g$ Molecular Motion With The Ductility Of Polymers Based On SBI, Macromolecular Science and Engineering Center, University of Michigan, American Physical Society's Mar. 1999 Meeting.

X. Li, A.F. Yee, "A Molecular Design To Enhance Ductility of High $T_g$ Glassy Polyesters and Polyestercarbonates", Macromolecular Science and Engineering Center, University of Michigan, American Physical Society's Mar. 2000 Meeting.

X. Li, A.F. Yee, "Correlation Of The Scope of Sub–/MathbfT$_g$ Molecular Motion With The Ductility Of Polymers Based On SBI", Macromolecular Science and Engineering Center, University of Michigan, Made available online Dec. 26, 1998.

X. Li, A.F. Yee, "Effect Of Linkage On Motional Cooperativity Of Po$_1$ymers Containing Cyclohexane Units", Macromolecular Science and Engineering Center, University of Michigan, Made available online Dec. 26, 1998.

X. Li, A.F. Yee, "A Rational Approach To The Design And Synthesis O$_f$ Tough Glassy Polymers", Macromolecular Science and Engineering Center, University of Michigan, Presentation made Jan. 25, 2000, High Temple Workshop, San Diego, CA.

*Primary Examiner*—Samuel A. Acquah
(74) *Attorney, Agent, or Firm*—Brooks & Kushman P.C.

(57) ABSTRACT

The present invention pertains to novel synthetic polymers which contain bulky carboxylic monomer units which contain minimally two aryl rings linked by one or more linking groups such that rotation of the aryl rings relative to each other is structurally prohibited, thus being a rigid bulky monomer unit, or sterically disfavored, thus being a rotationally hindered bulky monomer, and which contain at least one flexibilizing monomer which contains a six- to twelve-membered, conformable carboxylic structure. The bulky and flexible monomer units are linked by suitable linking groups to form polymers which exhibit high $T_g$ but which exhibit ductile behavior. The polymers have optical properties suitable for use as optical disks and other optical elements.

18 Claims, 4 Drawing Sheets

HIGH GLASS TRANSITION TEMPERATURE, DUCTILE, AND PROCESSABLE THERMOPLASTIC CONTAINING CONFORMABLE RING SEGMENTS

This invention was made with govermnent support under AFOSR grant F49620-98-1-0158. The govermnent has certain rights in the invention.

TECHNICAL FIELD

The present invention pertains to engineering thermoplastics which have a high glass transition temperature, $T_g$, are easily processable, and which despite their high $T_g$, exhibit suitable ductility for applications which require ductile thermoplastics. The present invention also pertains to use of such thermoplastics in optical and other devices, and to solvent processing of such thermoplastics.

BACKGROUND ART

The historical background of thermoplastics is by now well known. Some of the first successful thermoplastics, e.g. nylon (polyamide), and polyurethane, developed to compete with nylon, remain high volume products. Demand for increased performance has led to significant advances in thermoplastics. High melt temperature, high tensile strength, thermal stability, ready processability, and other chemical and physical properties have been greatly improved, but generally not at the same time. For example, in the 1960s, several promising polyimide polymers were developed. However, their lack of processability left open only uses which could bear high processing cost. Also in the 1960's and 70's, polyether thermoplastics containing sulfone linkages (polysulfones and polyether sulfones) and ketone linkages (polyether ketones) were developed. These polymers exhibited great strength even at elevated temperatures. However, their market share even today is limited due to their high cost and difficulties associated with their preparation. In some polymers with high melting points, increased crystallinity has rendered the polymers brittle, thus decreasing their suitability for many applications.

In addition to polymers with enhanced mechanical properties, polymers with lessened color, superior optical quality, particularly polymers with low birefringence have been desired. Polymethylmethacrylates and other acrylate-type thermoplastics have seen limited use in optical devices such as lenses and light conduits. However, these thermoplastics have low softening points which limits their applicability. Polycarbonates are widely used for optical disks. However, the high birefringence of higher molecular weight polycarbonates has restricted use to lower molecular weight polymers of lessened physical properties.

Polyesters prepared from conformable rings have been made before. For example polyesters containing residues of terephthalic acid and 1,4-cyclohexane dimethanol ((THDM) have been proposed as polyesters for plastic bottles and the like. However, the modest increase in physical properties of these polymers did not offset the high production cost due to the cost of CHDM. Polymers have also been prepared from high molecular weight, bulky bisphenols, and were found to exhibit high $T_g$. However, these polymers showed little ductility. Their brittleness prevented their use in many optical devices such as optical cables and optical disks.

It would be desirable to provide new polymers with a desirable combination of chemical and physical properties. In particular, it would be desirable to produce thermoplastic polymers which exhibit high melt temperatures and high $T_g$ while remaining ductile rather than brittle. It would be further desirable to provide such thermoplastics which, despite their high softening points, can be made optically clear with low birefringence, encouraging use as optical elements in hostile environments or where increased data storage capability and long term storage stability is desired. It would be yet further desirable to provide high $T_g$ polymers which can be solvent processed as well as being thermally processable.

SUMMARY OF INVENTION

It has now been surprisingly discovered that high $T_g$, ductile thermoplastics which also exhibit low birefringence can be prepared by a choice of repeating monomer units which include residues of a sterically bulky and rigid or rotationally hindered bisphenol or derivative thereof, and at least one flexible, ring-containing monomer characterized either as having a conformable six- to twelve-membered ring, or as being derived from a bisphenol. The resulting polymers have surprisingly elevated glass transition temperatures while exhibiting enhanced ductility as compared to other high $T_g$ thermoplastics. Moreover, the inventive thermoplastics can be processed in common solvents such as methylene chloride, tetrahydrofuran, and the like. The polymers exhibit low birefringence, even at high molecular weight. Suitable choice of monomers results in chiral polymers useful in optoelectronics.

DESCRIPTION OF THE PREFERRED EMBODIMENTS

The polymers of the present invention are preferably carbonate thermoplastics or polyester thermoplastics. However, other linking groups such as ether, sulfide, sulfone, ketone, and amide may also be employed. The preparation of thermoplastics herein are illustrated by preparation of polyester and polycarbonate thermoplastics. However, one skilled in the art of polymer synthesis can readily synthesize polymers with other linkages.

The present inventors have discovered that the deficiencies of prior art polymers based on bulky bisphenol residues or reactive analogs thereof, can be eliminated if one or more flexible comonomers are employed in significant amount. By the term "flexible" is meant a molecule whose polymer-contained residue confers sufficient flexibility so as to render the polymer as a whole ductile. This flexibility may be "conformationally flexible" due to the presence of a six- to twelve-membered ring characterized by at least two conformational structures, and thus capable of undergoing conformational transitions such as boat/chair transitions. The simplest examples of such structures are cyclohexane, piperidine, and piperazine, all of which exhibit boat and chair conformations. Other ring systems which are suitable include, but are not limited to, cyclooctane, cyclodecane, and cyclododecane. In addition to containing at least one conformable ring, the conformationally flexible monomer may contain heteroatoms, preferably non-adjacent heteroatoms selected from O, N, and S, and may be substituted with substituents which do not eliminate the ability of the molecules to conform. Non-limiting examples of suitable substituents include $C_{1-4}$ optionally substituted alkyl groups, preferably methyl groups and trifluoromethyl groups; $C_{1-2}$ alkenyl, preferably vinyl, allyl, and propenyl; halogens, preferably fluorine and chlorine; cyano and cyanoalkyl; and $C_{1-4}$ alkoxy. The choice of substituents may be affected by the particular synthetic pathway utilized to prepare the polymer, but is otherwise limited only by availability and cost.

The flexible monomers may also be multicyclic, containing two or more of the above-identified ring structures, or containing bridged ring structures, provided that the bridging group still allows for conformational flexibility. Preferred multi-ring structures include those derived from 1,1'-bis(4-hydroxycyclohexane), bis(4-hydroxycyclohexyl)methane, and hydrogenated bisphenol A.

Preferred conformational ring systems are six-membered ring structures optionally containing one or two O or N heteroatoms. The conformationally flexible monomers must have a functionality suitable to prepare the polymers. For example, but not by limitation, the functional groups may be carbonyl chloride sulfonyl chloride, carboxylic acid, carboxylic acid ester, chloro, hydroxyl, or amino groups. In some cases, two different functionalities may be employed. Preferred functionalities are carboxylic acid, carboxylic acid halides, and, in some cases, hydroxyl. A preferred six-membered ring conformationally flexible molecule is 1,4-cyclohexanedicarboxylic acid, which is available in cis, trans, and cis, trans, monomer mixtures. Transesterifyable derivatives of 1,4-cyclohexanedicarboxylic acid, e.g. the dimethyl ester; are also preferred. These monomers ar, readily available commercially or can be readily synthesized by conventional synthetic organic chemical methods.

In addition to use of conformationally flexible monomer moieties, flexibility may be incorporated into the polymer chain by bisphenol moieties having sufficient flexibility. These bisphenol moieties preferably are bisphenol carbonates or sulfonates, and correspond to the general formula:

where R' is a non-bulky linking group and -X- represents a sulfonate linkage. The linking R' group may be, for example, methylene, isopropylidene, hexafluoroisopropylidine, keto, sulfone, and the like. Most preferably, the flexible bisphenol monomer is bisphenol A carbonate

The bulky "rigid" bisphenol residues or their differently functional analogs contain the structural element where R is a linking group. R is preferably one or more substituted or unsubstituted methylene groups, i.e. $-(CH_2)_n-$, where n is in general 3 or less, preferably 1. The structural element must be rigid or rotationally hindered, i.e. hindered against rotation of the two aromatic rings to a greater degree than simple bisphenols such as bisphenol A. Rigidity may be provided by linking the aromatic rings together by a further linking structure, thus structurally prohibiting rotation due to the presence of multiple bornds to the aryl residues. Rotational hindrance may be obtained by selecting a linking group R which contains a bulky substituent which sterically prevents rotation; and by substituting both aryl rings, at positions ortho to the bridging R group, with bulky groups which limit rotation sterically. A non-rotationally .hindered bisphenol as that term is used herein is a simple bisphenol such as bispheno. A, bisphenol S, bisphenol F, and 1,1-bis(trifluoromethyl)-1,1-bis(4-hydroxybenzene).

The R linking group may be selected from a number of linking groups, including but not limited to ether, sulfide, sulfone, carbonate, substituted $C_{1-3}$ alkylene, keto, and the like. In the case of non-substitutable groups such as ether, sulfide, sulfone, carbonate, and keto, rotational hindrance must be achieved by the presence of ortho substituents on the aryl rings. While a single aryl ring has been shown in the previous structure on each side of the R linking group, these groups may be fused aryl rings, or linked aryl rings, e.g. naphthyl, anthryl, phenanthryl, biphenyl, and the like. The term "aryl" includes fused aryl ring systems unless indicated otherwise.

Rigid, bulky monomers are those whose linkages between the aryl rings prevent relative rotation of the aryl rings by the existence of covalent bonds, rather than merely steric hindrance. An example of such a molecule is:

wherein $R^1$ forms, with the two adjacent aryl rings, a cyclic or multicyclic aliphatic ring structure, said aliphatic ring structure optionally substituted with one or more substituents selected from the group consisting of alkyl, cycloalkyl, aryl, arylalkyl, alkaryl, halo, alkoxy, and cyano, and optionally containing one or more non-adjacent heteroatoms, the hydrocarbon substituents preferably containing four or less carbon atoms, preferably 1 or 2 carbon atoms, and most preferably one carbon atom, when such substituents are present.

Preferred rigid, bulky monomers are monomers whose residue contains a spirobisindenyl-linked bisphenyl structure, e.g., wherein the aromatic rings are substituted with "a" $R_1$ moieties, "a" being an integer from 1 to 4, preferably 1 to 3, and $R_1$ being any suitable substituent, for example those individually selected from $C_{1-8}$ alkyl, $C_{2-8}$ alkenyl, $C_{2-8}$ alkynyl, $C_{3-6}$ cycloalkyl, maleimido, cyano, halo, and $C_{6-14}$ aryl. The presence of unsaturated groups, when allowable under polymerization conditions, allows later crosslinking to a thermoset condition. $C_{1-4}$ alkyl, more preferably $C_{1-2}$ alkyl, and $C_{2-3}$ alkenyl and alkynyl groups are preferred, as are $C_6$ aryl and heteroaryl groups, when aryl groups are present. Longer chain alkyl and alkenyl groups may undesirably lower Tg. Methyl and phenyl substituents are most preferred. The two spiro-linked indenyl rings may also be substituted by 1–3 $C_{1-4}$ lower alkyl groups, cyano groups, or the like. Most preferably, the rigid monomer of this subtype is:

3,3,3',3'-tetramethyl-1,1'-spirobiindane (SBI or SPBI, herein), which may be derived from the commercially available A second preferred class of monomers are those corresponding to the formula:

where $R^3$ represents from 3 to 6 carbon atoms, which, when constituting 5 to 6 ring atoms, ring carbons may optionally be replaced by up to two preferably non-adjacent heteroatoms selected from N and O, wherein R' and "a" are as previously defined. The ring which includes $R^3$ may be aromatic. Preferred examples of such monomers include 1,1'-bis(4-hydroxyphenyl)-cyclohexylmethane (cyclohexyl bisphenol) and 1,1'-bis(4-hydroxyphenyl)-3,3,5-trimethylcyclohexylmethane (trimethylcyclohexyl bisphenol), "Tmc". Other examples of the rigid monomer residues of this subtype include:

Preferred polymers of the subject invention include polyester, polycarbonate, and polyestercarbonate polymers, as these polymers are readily accessible from available monomers or monomers readily synthesized by well known techniques. However, other polymer systems, preferably those containing amide, sulfone, and keto linkages may be synthesized from analogous monomers by techniques previously reported in the literature. For example, sulfone polymers may be obtained by reaction of a bulky bisphenol with a 1,4-bis(sulfonylmethyl)cyclohexane or 1,4-bis (sulfonyl)cyclohexane in an aprotic solvent in the presence of base, i.e. KOH or alkali metal carbonate. Also preferred are polyetherarriides.

In addition to the most preferred polyester, polycarbonate, and polyestercarbonate thermoplastics, thermoplastics containing the aforementioned linkages and not more than 30 mol percent, more preferably not more than 20 mol percent, and most preferably not more than 10 mol percent of sulfone, ketone, ether, or amide linkages are preferred as high Tg, ductile polymers. In many cases, such polymers will be block copolymers where polyester, polycarbonate, or polyestercarbonate oligomers are "chain extended" to higher weight polymers by aid of reactive chain extender molecules containing suitable non-ester and non-carbonate forming linking groups.

In the polymers of the present invention, the bulky, rigid or rotationally hindered monomer and the flexible monomer may be accompanied by up to 40 mol percent, based on total monomer content of all kinds, of additional monomers which do not correspond to either category of monomer. These additional monomers may include terephthalic acid esters, phthalic acid esters, naphthalenecicarboxylic acid esters, dihydroxynaphthalene esters, and the like. Preferably, these additional monomers are included in amounts less than 10 mol percent, preferably less than 5 mol percent based on total monomer.

Thus, the polymers of the subject invention include a ductile, glassy thermoplastic polymer having a glass transition temperature $T_g$ higher than 230° C., more preferably greater than 250° C., and most preferably greater than 260°C., this polymer comprising repeating units where n is such that the weight average molecular weight Mw is greater than 10,000 Da;
wherein A is
  a)i) a bulky, rigid aromatic residue containing at least two aryl rings linked by a structurally rigid linking group,
  a)ii) a rotationally hindered aromatic residue containing at least two aryl rings linked by a rotationally hindering linking group or by a non-rotationally hindering linking group, but being rotationally hindered by sterically bulky substituents on adjacent aryl rings;
wherein B is
  b)i) a ductility-inducing monomer residue containing at least one conformable carbocyclic ring structure of six to twelve ring atoms, optionally containing one or more non-adjacent heteroatoms selected from the group consisting of N, O, and S, or
  b)ii) a ductility-inducing molecule selected from the group consisting of bisaryl compounds of the formula wherein R is an optionally substituted alkylene, cycloalkylene, ether, thioether, keto, sulfone, ester, carbonate, or amide linking group;

wherein each X and Y individually are linking groups selected from the group consisting of wherein when A is a bulky, rigid aromatic residue a)i) containing at least two aryl residues, both b)i and b)ii are present, and
  wherein A is a bulky rotationally hindered aromatic residue a)ii) containing it least two aryl rings, one or both of b)i and b)ii are present, and
  wherein the mol ratio of residue A to residue B is from 8:1 to about 1:3, and wherein A-X and B-Y are present in any order.

Further, and more preferably, the polymers of the subject invention include the polymer wherein A is a bulky, rigid aromatic bisphenol residue having the structure wherein $R_1$ forms, with the two adjacent aryl rings, a cyclic or multicyclic aliphatic ring structure, this aliphatic ring structure optionally substituted with one or more substituents selected from the group consisting of alkyl, cycloalkyl, aryl, arylalkyl, alkaryl, halo, alkoxy, and cyano, and optionally containing one or more non-adjacent heteroatoms.

The bulky rotationally hindered monomers are especially interesting, as polymers of exceptionally high $T_g$ can be prepared. To place the high $T_g$ in perspective, commercial bisphenol A carbonate thermoplastics exhibit a $T_g$ which is lower than the subject invention thermoplastics by some 100° C.–130° C. The polymers, in addition to high $T_g$, also exhibit high thermal stability in air.

The ratio of bulky monomer moieties to flexible moieties may range from 1:10 to 10:1, but are more preferably in the range of 3:7 to 7:3, and most preferably about 1:1. The molecular weights $M_w$ of the polymers may range from 10,000 Da to $2\times10^6$ Da or higher, preferably from 20,000 Da to $1\times10^6$ Da, and most preferably 20,000 Da to 100,000 Da. Polydispersities may range from 1.1 to 20, with polydispersities in the range of 1.1 to 15 being preferred, and the range of 1.1 to 5 being most preferred. Due to methods of preparation, polydispersity tends to increase with increasing molecular weight. In some cases, it may be possible to lower polyclispersity by removal of lower molecular weight species by solvent extraction or other techniques. In some cases, high polydispersities may be favored for ease of fabrication, i.e. extrudability.

A significant advantage of the present polymers is the ability to make high molecular weight polymers without incurring brittleness. For example, bisphenol A, polycarbonate is widely used for manufacture of optical disks. The "flow" birefringence of polycarbonate polymers is high at high molecular weights, and thus lower molecular weight polycarbonates are specified. These lower molecular weight polymers do not have desirable physical properties, however. Attempts have been made to employ higher molecular weight polymers of different structure, which also exhibit low birefringence. However, these polymers have proven to be brittle. Surprisingly, the subject invention polymers exhibit inherently low birefringence, yet are not brittle. This combination of properties allows manufacture of superior optical disks which may not only allow greater storage capacity, but also will exhibit less fragility and greater storage stability. Due to the decreased brittleness, the subject polymers can also be used for other optical elements, including optical fibers, lenses, etc., and by choice of a chiral monomer, for polarization selective elements such as reflectors, delay filters, and the like.

Figure 3:
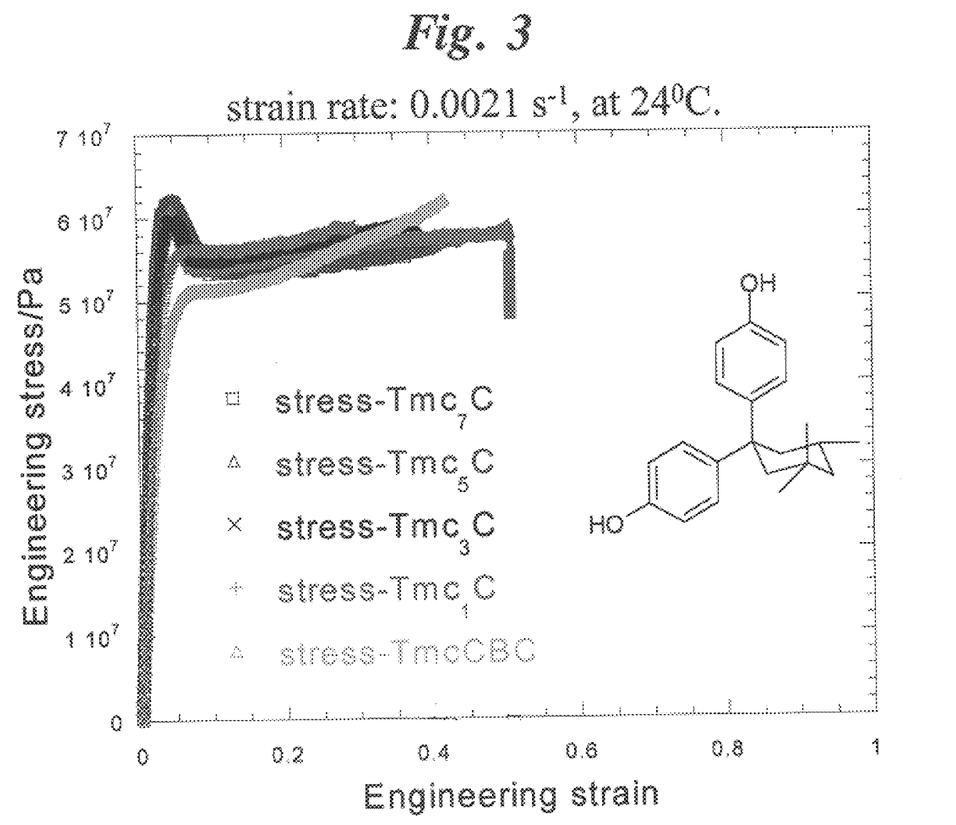
FIG. 3 illustrates stress/strain behavior for several polymers prepared from rotationally hindered bulky monomers.
Figure 4:
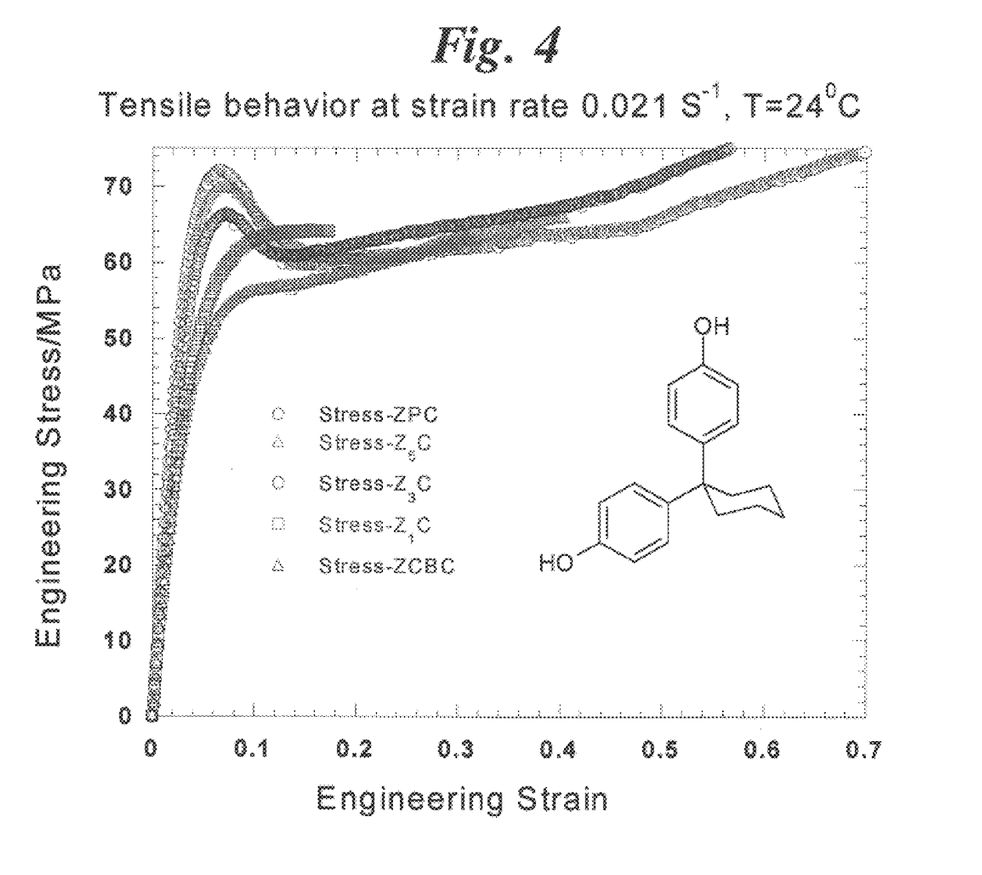
FIG. 4 illustrates stress/strain behavior for several additional polymers prepared from rotationally hindered bulky monomers.

The surprising improvement in ductility achieved in the subject invention polymers is shown by the stress/strain curves of the Figures. In FIGS. 3 and 4 for example, the stress/strain curves of polymers having varying numbers of repeating bulky monomers of subtype B are presented. These Figures illustrate that beyond the yield point, plastic deformation occurs over substantial strain. However, ductility is limited at lower bulky monomer/flexible monomer mol ratios. It is estimated that at ratios below 1:3, the ultimate yield will substantially coincide with the peak yield strength, i.e. substantially no ductility will be evident. It is also interesting that the incorporation of bisphenol A-derived moieties does not improve the ductility when flexible linkage content is low.

Figure 1:
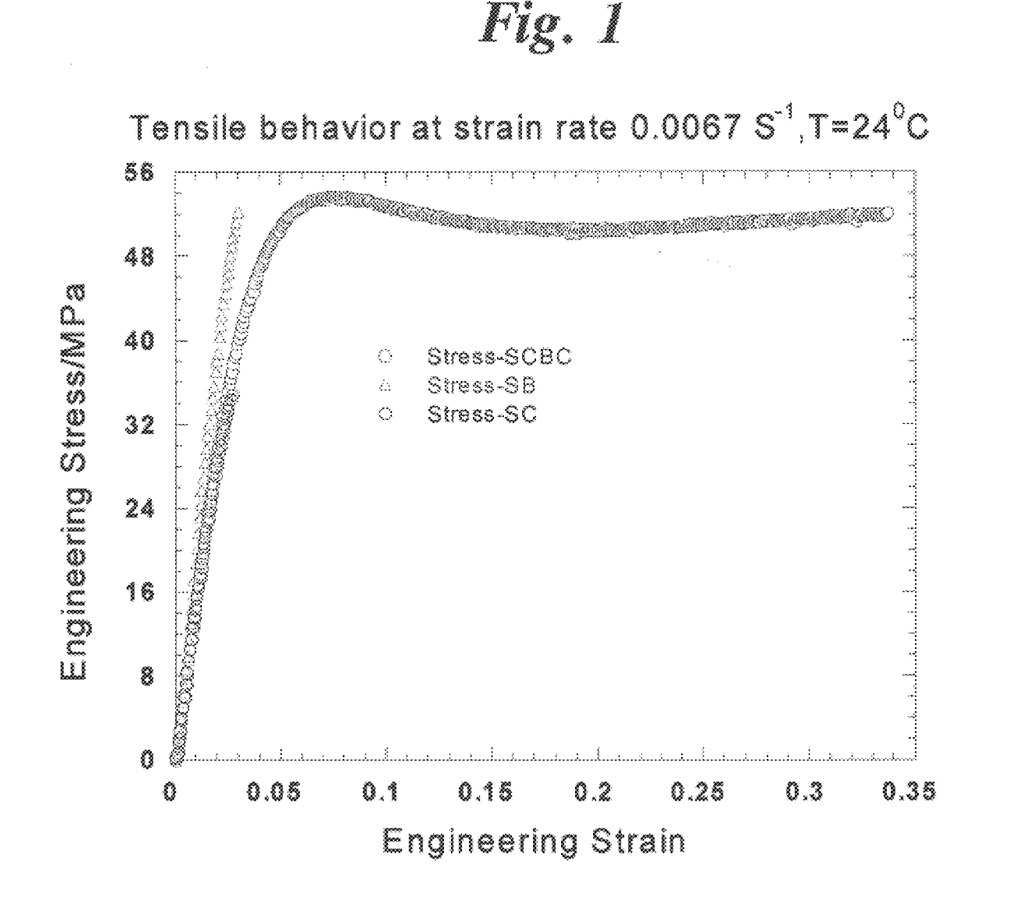
FIG. 1 illustrates stress/strain behavior for a polymer of the present invention, showing ductile behavior; and two non-ductile polymers prepared from the same rigid, bulky monomer, but not having the required combination of flexibilizing monomers.
Figure 2:
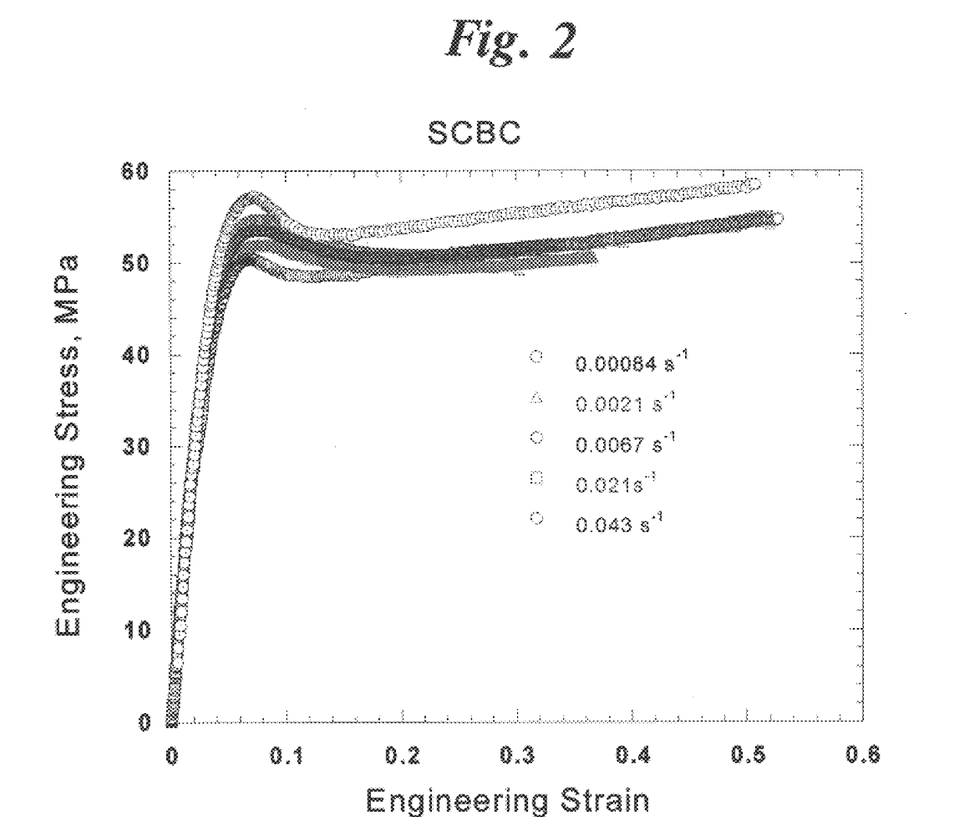
FIG. 2 illustrates stress/strain behavior for a single polymer of the subject invention measured at different rates of strain.

In FIGS. 1 and 2, polymer SB is a novel polycarbonate containing SPBI residues and bisphenol A residues. Note that the tensile strength and ultimate yield strength coincide; the polymer, despite containing bisphenol A flexibilizing segments, is not ductile. The SC polymer shows similar behavior in a polyester prepared from SPBI and 1,4-cyclohexanedicarboxylic acid. While cyclohexane dicarboxylic acid may be used alone as a flexibilizing monomer with rotationally hindered balky bisphenols, with rigid bulky bisphenols it fails to provide the required ductility. However, a polyester containing SPBI, CHDM, and bisphenol A exhibits Highly ductile behavior. This ductile behavior is substantially the same at various rates of shear, as shown in FIG. 2.

The term "ductile" as used herein is descriptive of a thermoplastic which displays the type of stress-strain curve as that of polymer SCBC in FIGS. 1 and 2, i.e., ;i polymer which exhibits plastic deformation at levels of strain above the yield point. This ductile behavior is in contrast to polymers which exhibit no yield point, i.e., where the tensile strength and ultimate tensile strength coincide. This behavior is shown by the SC and SB polymers of FIG. 1. The polymers of the subject invention are all ductile.

The polymers of the present invention may be prepared by numerous well known synthetic techniques. For example, polyesters may be prepared from dicarboxylic acid-functional monomers and bis-(hydroxyl)-functional monomers by esterification. water being removed as the condensation polymerization proceeds. Carboxylic acid derivatives may also be used. For example, lower alkyl carboxylic acid esters, particularly the methyl esters, may be used, removal of methanol accompanying the transesterification. Polycarbonate linkages are preferably prepared by forming the bis(chloroformate) of one of the monomers and adding a second, bis(hydroxyl) functional monomer. Polymers containing sulfone linkages can be prepared analogously using the corresponding sulfonylchlorides. Mixed linkage polymers may be prepared as well, for example by preparation of low molecular weight oligomers of one linkage type, followed by condensation of these oligomers with a monomer or oligomer of another type. All these reactions are well known, and useful procedures may be found in the literature. A useful monomer for preparing polyether amides by reaction of an aminoether with a dicarboxylic acid is 6,6'-bis(4-aminophenoxy)-3,3,3',3'-tetramethyl- 1,1-spirobiindane:

Surprisingly, despite their high $T_g$, the polymers of the subject invention remain soluble in common organic solvents such as methylene chloride, carbon tetrachloride, tetrahydromethane, dimethylformamide, and the like. Thus, unlike many engineering thermoplastics, the present invention thermoplastics may be used as coatings, varnishes, or in particular, as impregnants for fiber reinforcement. For example, tows of glass, carbon fibers, or other fibrous reinforcement may be solution impregnated to form a thermoformable product. Impregnation of woven and non-woven fiber reinforced products, including filament wound structures, may also be accomplished. These products, following impregnation, are dried by removal of solvent, and may then be used to form fiber-reinforced, thermoplastic matrix articles by subjecting to temperatures above the thermoplastic melting point, preferably under pressure. Items such as aircraft wing and fuselage elements, golf club shafts, tennis racquets, seat back frames, vehicle body panels, and other products may be fabricated readily.

Having generally described this invention, a further understanding can be obtained by reference to certain specific examples which are provided herein for purposes of illustration only and are not intended to be limiting unless otherwise specified.

In the subject examples, polycarbonate copolymers were synthesized using a solution condensation polymerization method. The oligomers are synthesized first by unbalanced feeding of bulky bisphenol monomer and its corresponding chloroformates. 1,4-cyclohexylene dicarboxylic chloride is then introduced to form the block copolymers. Cumylphenol is used as an end-capping agent, although other monofunctional capping agents are also suitable. The copolymers obtained by this approach using trimethylcyclohexylbisphenol are denoted as $Tmc_xC$, where Tmc stands for trimethylcyclohexyl bisphenol, C represents 1,4-cyclohexylene dicarboxylate, and x represents the average number of repeat units within each bisphenol polycarbonate block. The synthesis may be illustrated by the following synthesis of $Tmc_3C$.

EXAMPLE 1

Synthesis of Tmc₃C

In a 500 ml three-neck reaction flask, equipped with a magnetic stirring bar, 10 g (32.21 mmol) of Tmc bisphenol, 6.6 g (64.42 mmol) of triethylamine (TEA) and 0.8g of N,N-dimethyl-4-amino pyridine (DMAP) are suspended in 160 ml of dichloromethane at 0° C. 7.27 g (16.11 mmol) of Tmc bisphenol bischloroformate in 50 ml dichloromethane is slowly added over a period of 50 min. The solution is then held at room temperature for another 30 min. 3.37 g (16.11 mmol) of 1,4-cyclohexylene dicarboxylic chloride in 50 ml of dichloromethane is added to produce a very viscous solution. The addition of 1,4-cyclohexylene dicarboxylic chloride is initially at a high rate, and is gradually slowed down towards the end of the reaction. The whole process takes about 30 min. 1 g of cumylphenol in 50ml dichloromethane is added to end cap the polymer. The reaction mixture is then poured into a blender filled with one liter of isopropanol. A white polymer is precipitated, filtered and dried. To remove impurities, the polymer is repeatedly (three times) redissolved in dichloromethane, precipitated from isopropanol, filtered and dried. 17 g of Tmc₃C was obtained. The polymer has a $T_g$ of ca. 252° C.

EXAMPLES 2–4

Other $Tmc_xC$ polymers are made similarly, by changing the ratio of the bulky bisphenol bischloroformate to bulky bisphenol. In $Tmc_1C$ case no bischloroforrnate was used, only cyclohexylene dicarboxylic chloride was used to react with Tmnc bisphenol to form polyester $Tmc_1C$.

EXAMPLE 5

Synthesis of Polymers Containing Rigid, Bulky Bisphenol

In a 1000 ml three-neck reaction flask equipped with a magnetic stirring bar, 15 g (48.63 mmol) of spirobiindane, 11.02 g(48.63 mmol) of bisphenol A, 19.68 g (194.52 mmol) of triethylamine (TEA) and 2.38 g of N,N-dimethyl-4-amino pyridine (DMAP) are suspended in 300 ml of dichloromethane at 0°C. 20.33 g (97.26 mmol) of 1,4-cyclohexylene dicarboxylic chloride in 200 ml of dichlorometane is added to produce a very viscous solution. The addition of 1,4-cyclohexylene dicarboxylic chloride is initially at a high rate, and is gradually slowed down towards the end of the reaction. The whole process takes about 60 min. The solution is held at room temperature for about 3 hours, then 3 g of cumylphenol in 50 ml dichloromethane is added to end cap the polymer. The reaction mixture is then poured into a blender filled with 1.4 liters of isopropanol. A white polymer is precipitated, filtered and dried. To remove impurities thoroughly, the polymer is repeatedly (three times) redissolved in dichloromethane, precipitated from isopropanol, Filtered and dried. 33 g of "SCBC" is obtained. The polymer has a $T_g$ of 246° C., a number average molecular weight of 39,000 Da, a density of 1.11 g/cm³, and a polydispersity of 1.99.

EXAMPLE 6

In the same manner as Example 5, a terpolymer of Tmc bisphenol, bisphenol A, and cyclohexanedicarboxylic acid is produced. The polymer has a $T_g$ of 257° C.

Relevant properties of some of the polymers of the present invention and non-intention and prior art polymers are set forth in Table 1 below.

TABLE 1

| Polymer | Mn | Mw | PDI | $T_g$ (° C.) |
| --- | --- | --- | --- | --- |
| SC (Comparative)[1] | 51 kDa | 778 kDa | 15.2 | 274.7 |
| SB (Comparative)[2] | 126 kDa | 262 kDa | 2.1 | 198 |
| SCBC[3] | 39 kDa | 77 kDa | 1.97 | 245 |
| TCBC[4] | 66 kDa | 131 kDa | 1.98 | 257 |
| Tmc₁C | 40 kDa | 84 kDa | 2.1 | 282.6 |
| Tmc₃C | 75 kDa | 119 kDa | 1.6 | 252 |
| Tmc₅C | 80 kDa | 137 kDa | 1.7 | 244.9 |
| Tmc₇C | 85 kDa | 147 kDa | 1.7 | 244.5 |
| SBI-C-PEA[5] | 19.8 kDa | 45.4 kDa | 2.3 | 262.8 |
| SBI-F-PEA[6] | 18.2 kDa | 47.3 kDa | 2.6 | 264.0° C. |

[1] A copolymer polyester containing SBI residues and cyclohexanedicarboxylic acid residues.
[2] A copolymer polycarbonate containing SBI residues and bisphenol A residues.
[3] A terpolymer polyester of the subject invention containing residues of SBI, bisphenol A, and 1,4-cyclohexanedicarboxylic acid.
[4] A terpolymer polyester containing Tmc bisphenol residues, bisphenol A residues and 1,4-cyclohexanedicarboxylic acid residues, in a 1:1:2 ratio.
[5] A copolymer polyetheramide of 6,6'-bis(4-aminophenoxy)-3,3,3',3'-tetramethyl-1,1'-spirobiindane and 1,4-cyclohexanedicarboxylic acid.
[6] A copolymer polyetheramide of 6,6'-bis(4-aminophenoxy)-3,3,3',3'-tetramethyl-1,1'-spirobiindane and 4,4'-hexafluoropropylidene-bis(benzoic acid).

What is claimed is:

1. A ductile, glassy thermoplastic polymer having a glass transition temperature $T_g$ higher than 230° C., said polymer comprising repeating units where n is such that the weight average molecular weight Mw is greater than 10,000 Da;

wherein A is a)i) a bulky, rigid aromatic residue containing at least two aryl rings linked by a linking group, a)ii) a rotationally hindered aromatic residue containing at least two aryl rings linked by a linking group;

wherein B is b)i) a ductility-inducing monomer residue containing at least one conformable carbocyclic ring structure of six to twelve ring atoms, optionally containing one or more non-adjacent heteroatoms selected from the group consisting of N, O, and S, or b)ii) a ductility-inducing molecule selected from the group consisting of bisaryl compounds of the formula wherein R is an optionally substituted alkylene, cycloalkylene, ether, thioether, keto, sulfone, ester, carbonate, or amide linking group;

wherein each X and Y individually are linking groups selected from the group consisting of -continued wherein when A is a bulky, rigid aromatic residue a)i) containing at least two aryl residues, both b)i and b)ii are present, and wherein A is a bulky rotationally hindered aromatic residue a)ii) containing at least two aryl rings, one or both of b)i and b)ii are present, and wherein the mol ratio of residue A to residue B is from 8:1 to about 1:3, and wherein A-X and B-Y are present in any order.

2. The polymer of claim 1, wherein the linking groups X and Y are individually selected from the group consisting of ester and carbonate linkages.

3. The polymer of claim 2, wherein A is a bulky, rigid aromatic bisphenol residue having the structure wherein $R^1$ forms, with the two adjacent aryl rings, a cyclic or multicyclic aliphatic ring structure, said aliphatic ring structure optionally substituted with one or more substituents selected from the group consisting of alkyl, cycloalkyl, aryl, arylalkyl, alkaryl, halo, alkoxy, and cyano, and optionally containing one or more non-adjacent heteroatoms.

4. The polymer of claim 3 wherein $R^1$ together with the aryl rings adjacent to $R^1$ form a multicyclic spiro linkage.

5. The polymer of claim 4, wherein A is 3,3,3',3'-tetramethyl-1,1'-bispirobiindane.

6. The polymer of claim 3, wherein $R^1$ together with the adjacent aryl rings form a non-spiro, fused ring system.

7. The polymer of claim 1, wherein X and Y individually are ester or carbonate linkages, and B are residues derived from one or more of 1,4-cyclohexanedicarboxylic acid or esterifyable or transesterifyable derivatives thereof; or a non-sterically hindered bisphenol.

8. The polymer of claim 3, wherein X and Y individually are ester or carbonate linkages, and B are residues derived from one or more of 1,4-cyclohexanedicarboxylic acid or esterifyable or transesterifyable derivatives thereof; or a non-sterically hindered bisphenol.

9. The polymer of claim 1, wherein A is a bulky, sterically hindered residue selected from the group consisting of:

a)ii)1 two optionally substituted aryl rings linked by a rotationally hindering linking group; and a)ii)2 two aryl rings linked by a linking group which does not hinder rotation, each aryl ring bearing at least one ortho-positioned sterically hindering organic group which hinders rotation, each of said aryl rings optionally further substituted, the rotational hindrance of a)ii) 1 and a)ii)2 being greater than the rotational hindrance exhibited by bisphenol A.

10. The polymer of claim 9, wherein said sterically hindered residue a)ii1 has the structure where o is 0, 1, or 2; $R^2$ and $R^3$ are the same or different, and are hydrogen, $C_{1-8}$ alkyl, $C_{3-6}$ cycloalkyl, $C_{6-10}$ aryl, $C_{6-10}$ arylmethyl, or $R^2$ and one of $R^3$ together form a cyclic or multicyclic ring structure, $R^2$ and $R^3$ optionally substituted by halo, cyano, alkoxy, or aryl groups, with the proviso that not all of $R^2$ and $R^3$ are H.

11. The polymer of claim 10, wherein o is 0 and $R^2$ is an optionally subtituted cyclohexyl group.

12. The polymer of claim 11, wherein X and Y are individually selected from the group consisting of ester and carbonate groups.

13. The polymer of claim 10, wherein B comprises a residue derived from 1,4-cyclohexanedicarboxylic acid, or a bisphenol.

14. The polymer of claim 1, wherein X and Y are individually selected from the group consisting of ester and carbonate, and wherein said polymer is a block copolymer having the formula where a is minimally 2 on average.

15. The block copolymer of claim 14, wherein a is on average 4, and B comprises a residue of 1,4-cyclohexanedicarboxylic acid, or a non-rotationally hindered bisphenol.

16. The block copolymer of claim 15, wherein B comprises the residue of 1,4-cyclohexanedicarboxylic acid and the residue of a non-sterically hindered bisphenol.

17. In an optical disk having a thermoplastic substrate, the improvement comprising selecting as said thermoplastic the thermoplastic of claim 1.

18. A thermoformable, fiber reinforcement containing product, comprising a thermoplastic-containing, solution-impregnated fiber reinforcement, said thermoplastic comprising the thermoplastic of claim 1.

* * * * *